United States Patent
Wang et al.

(10) Patent No.: US 10,138,579 B2
(45) Date of Patent: Nov. 27, 2018

(54) FIBER TOW TREATMENT APPARATUS AND SYSTEM

(71) Applicant: United States Council For Automotive Research, LLC, Southfield, MI (US)

(72) Inventors: Chen-Shih Wang, Troy, MI (US); Charles William Knakal, Grosse Ile, MI (US); Jeffrey Scott Dahl, Livonia, MI (US); Bhavesh Suresh Shah, Troy, MI (US)

(73) Assignee: United States Council For Automotive Research, LLC, Southfield, MI (US)

( * ) Notice: Subject to any disclaimer, the term of this patent is extended or adjusted under 35 U.S.C. 154(b) by 567 days.

(21) Appl. No.: 14/626,015

(22) Filed: Feb. 19, 2015

(65) Prior Publication Data

US 2016/0177475 A1    Jun. 23, 2016

Related U.S. Application Data

(63) Continuation of application No. 13/031,360, filed on Feb. 21, 2011.

(51) Int. Cl.
*D01G 1/04*        (2006.01)
*D01D 11/02*       (2006.01)
(Continued)

(52) U.S. Cl.
CPC .............. *D01G 1/04* (2013.01); *B29C 70/12* (2013.01); *B65H 51/005* (2013.01); *D01D 11/02* (2013.01);
(Continued)

(58) Field of Classification Search
CPC ........ D02J 1/18; D02J 1/20; D02J 1/16; D02J 11/00; D01G 1/04; D01G 1/10;
(Continued)

(56) References Cited

U.S. PATENT DOCUMENTS

| 1,350,687 A | 8/1920 | Turner |
| 2,180,745 A | 11/1939 | Milhomme |

(Continued)

FOREIGN PATENT DOCUMENTS

| SU | 785254 | 12/1980 |
| WO | 2007075202 A1 | 7/2007 |

OTHER PUBLICATIONS

Kazumasa Kawabe, Tatsuki Matsuo and Zen-Ichiro Maekawa, New Technology for Opening Various Reinforcing Fiber Tows, Soc. Mat. Science, Japan, vol. 47, No. 7, pp. 727-734, Jul. 1998.

(Continued)

*Primary Examiner* — Amy Vanatta
(74) *Attorney, Agent, or Firm* — Brooks Kushman P.C.

(57) ABSTRACT

In one embodiment, a fiber treatment system includes a rotatable nubbed roller including an axis of rotation, a surface, and a number of spaced apart nubs projecting away from the surface, the number of spaced apart nubs imparting a number of spaced apart openings in a fiber tow. In another embodiment, the fiber treatment system further includes an optionally rotatable spreader roller for flattening the fiber tow. In yet another embodiment, the loosened, but still continuous fiber tow is chopped by a downstream chopper to form short fibers with reduced tow sizes.

5 Claims, 8 Drawing Sheets (51) Int. Cl.
  *D02J 1/18* (2006.01)
  *B29C 70/12* (2006.01)
  *B65H 51/005* (2006.01)
  *B29K 105/12* (2006.01)
  *B29K 307/04* (2006.01)

(52) U.S. Cl.
  CPC ............ *D02J 1/18* (2013.01); *B29K 2105/12* (2013.01); *B29K 2307/04* (2013.01); *B65H 2701/31* (2013.01); *B65H 2701/38* (2013.01); *Y10T 428/2913* (2015.01); *Y10T 428/2975* (2015.01)

(58) Field of Classification Search
  CPC .. D01G 1/00; D01G 1/02; D01G 9/06; D01G 21/00; D01G 5/00; D01G 7/04; D01G 7/06; D01D 11/02; B65H 51/005; B29C 70/12
  USPC ................................................................ 28/282
  See application file for complete search history.

(56) References Cited

U.S. PATENT DOCUMENTS

| | | | |
|---|---|---|---|
| 2,216,759 A * | 10/1940 | Simison | C03B 37/06 425/81.1 |
| 2,920,373 A | 1/1960 | Gresham | |
| 3,034,180 A | 5/1962 | Greiner et al. | |
| 3,088,843 A | 5/1963 | Schaar | |
| 3,137,893 A | 6/1964 | Gelpke | |
| 3,156,016 A * | 11/1964 | Dunlap | D02J 1/18 156/166 |
| 3,421,185 A * | 1/1969 | Gorrafa | D01H 5/24 19/65 T |
| 3,440,689 A * | 4/1969 | Murakami et al. | D01G 1/10 28/282 |
| 3,460,416 A | 8/1969 | Gilbert | |
| 3,461,508 A * | 8/1969 | Cole | D02J 1/18 28/282 |
| 3,466,861 A * | 9/1969 | Watson et al. | D01D 10/0436 19/0.56 |
| 3,497,920 A * | 3/1970 | Brownell | D02J 1/18 19/65 T |
| 3,780,399 A * | 12/1973 | Morel | D01G 9/06 19/97 |
| 3,812,561 A | 5/1974 | Lundgren | |
| 4,179,776 A * | 12/1979 | Wortman | D04H 3/02 19/163 |
| 5,372,494 A | 12/1994 | Vaughan | |
| 5,895,622 A * | 4/1999 | Ramani | B05D 1/045 118/308 |
| 6,385,828 B1 * | 5/2002 | Kiss | D02J 1/18 19/65 T |
| 6,743,392 B2 * | 6/2004 | Tanaka | B29B 15/122 264/136 |
| 7,386,924 B2 | 6/2008 | Muth et al. | |
| 2002/0104420 A1 * | 8/2002 | Bascom | C03B 37/16 83/665 |
| 2004/0259706 A1 | 12/2004 | Ueda et al. | |
| 2005/0082721 A1 | 4/2005 | Haque et al. | |
| 2006/0053593 A1 * | 3/2006 | Gombash, Jr. | D01G 7/00 19/66 T |
| 2006/0141884 A1 | 6/2006 | Haque | |
| 2007/0029030 A1 | 2/2007 | McCowin | |
| 2007/0057404 A1 * | 3/2007 | Hager | B29C 43/02 264/257 |
| 2010/0178495 A1 | 7/2010 | Taketa et al. | |

OTHER PUBLICATIONS

Non-Final Office Action dated Oct. 1, 2014, U.S. Appl. No. 13/031,360, filed Feb. 21, 2011.

* cited by examiner

FIBER TOW TREATMENT APPARATUS AND SYSTEM

CROSS-REFERENCE TO RELATED APPLICATIONS

This application is a continuation of U.S. application Ser. No. 13/031,360 filed Feb. 21, 2011 the disclosure of which is hereby incorporated in its entirety by reference herein.

STATEMENT REGARDING FEDERALLY SPONSORED RESEARCH OR DEVELOPMENT

The present invention was made with Government support under Department of Energy Cooperative Agreement No. DE-FC26-020R22910.

BACKGROUND

1. Technical Field

The present invention relates to fiber tow treatment apparatus and system, and particularly fiber tow treatment apparatus and system for making fiber reinforced polymer composites.

2. Background Art

Fiber reinforced polymer composites have been used to provide lightweight engineering structures. The use of existing fiber reinforced polymer composites may be limited due to prohibitive costs associated with the production of fibers suitable for forming the composites.

SUMMARY

In one embodiment, a fiber tow treatment system includes a rotatable nubbed roller including an axis of rotation, a base having a surface, and a number of spaced apart nubs projecting from the surface, the spaced apart nub imparting spaced apart openings in a fiber tow. In certain instances, at least a portion of the openings are discrete openings spaced apart from each other. In certain other instances, the spaced apart nubs may be arranged as a readily detachable piece relative to the base of the rotatable nubbed roller. In yet certain other instances, the spaced apart nubs and the surface of the base are of different metallic or non-metallic materials. In yet certain other instances, the spaced apart nubs include a polymeric material. In certain other instances, the spaced apart nubs are integral to the base. In certain other instances, the spaced apart nubs are non-uniformly positioned along the axis of rotation.

In another embodiment, the fiber treatment system further includes a spreader roller upstream of the rotatable nubbed roller for flattening the fiber tow. The spreader roller is optionally rotatable.

In yet another embodiment, the fiber treatment system further includes a second and/or third spreader roller upstream of the rotatable nubbed roller, the second and/or third spreader roller is optionally rotatable.

In yet another embodiment, the fiber treatment system further includes a second rotatable nubbed roller downstream of the spreader roller.

In yet another embodiment, the fiber treatment system further includes a chopping station downstream of the rotatable nubbed roller for chopping the loosened fibers tows to produce chopped fibers with reduced tow sizes.

BRIEF DESCRIPTION OF THE DRAWINGS

FIG. 1A1 depicts a cross-sectional view of a fiber treatment system according to one embodiment;

FIG. 1A2 depicts a perspective view of a nonlimiting example of a rotatable nubbed roller employed in the fiber treatment system of FIG. 1A1;

FIG. 1B depicts a cross-sectional view of a fiber treatment system according to another embodiment;

FIG. 1C depicts a cross-sectional view of a fiber treatment system according to yet another embodiment;

FIGS. 6A1 and 6A2 depict analysis values in relation to the fiber treatment system of FIG. 5A;

FIGS. 6B1 and 6B2 depict analysis values in relation to the fiber treatment system of FIG. 5B;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

In one or more embodiments, a fiber treatment system is provided to effect the production of cost effective fiber tows with tow sizes suitable for forming fiber reinforced polymer composites having desired physical properties. In particular, the fiber treatment system produces loosened fiber tows ready to be chopped to form chopped, shorter fibers with reduced fiber tow sizes. Non-limiting examples of the fibers include carbon fibers, glass fibers, polymer fibers, natural fibers or combinations thereof.

In one or more embodiments, the term "fiber tow" may refer to a fiber bundle of fiber filaments, optionally adhered or connected to each other. The fiber filaments may be adhered or connected to each other via a polymer and/or resin coating. The term "fiber tow size" may refer to a cross-sectional dimension of the fiber tow measured in a total number of fiber filaments. A 50K fiber tow, for instance, refers to a fiber bundle of about 50,000 fiber filaments grouped together.

Fibers such as carbon fibers with smaller tow sizes may be significantly more expensive to produce due to relatively lower production throughput and higher energy consumption per equal weight of manufactured fiber. Attempts have been made to mechanically split or separate lower cost, large tow fibers and re-spool them into smaller tow products for downstream applications. The tow splitting process, however, requires specialized equipment and may be complicated by frequent occurrence of twisting of the long continuous fiber tows. Consequently, using chopped fibers derived from these mechanically split small tow fibers is cost inefficient in general and retards the effective use of resultant fiber-containing products such as fiber reinforced polymer composites.

In one or more embodiments, the fiber treatment system includes a rotatable nubbed roller having thereupon spaced apart protruding nubs. Fiber tows may be pressed against the spaced apart nubs to be penetrated and to create spaced apart openings within the fiber tows. As a result, the fiber tows are opened or loosened due to the formation of these spaced apart openings. The loosened fiber tows may be subsequently chopped and chopping allows fiber tows to naturally break apart to form chopped fibers with reduced tow sizes. The fiber tows are merely loosened without having to be carefully separated and organized into individual spools. The fiber treatment system, according to one or more embodiments, therefore provides a simple and cost effective way of producing fibers for certain fiber reinforced composite applications.

In one or more embodiments, the spaced apart nubs may be varied in pattern and/or shape to accommodate particular needs of a fiber treatment project. In certain instances, the spaced apart nubs are arranged non-uniformly and randomly. In certain instances, the fiber tows can be loosened or opened in a random fashion, which, when coupled with subsequent chopping, helps provide a population of chopped fibers with randomized cross-sectional sizes suitable for certain composite making processes requiring low viscosity of fiber-resin mixtures, enabling the production of desired high performance composites.

In one or more embodiments, the spaced apart nubs may be arranged as a detachable piece that is readily attachable to the base of the rotatable nubbed roller or any of the fiber rollers such as a spreader roller 104 described herein. Thus, a simpler and more versatile system and hence greater economic efficiency may be achieved.

Figure 1A:
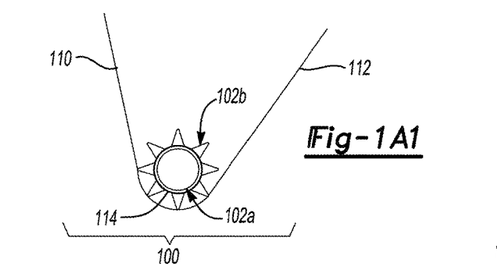
Figures 1A, 1B, 1C:
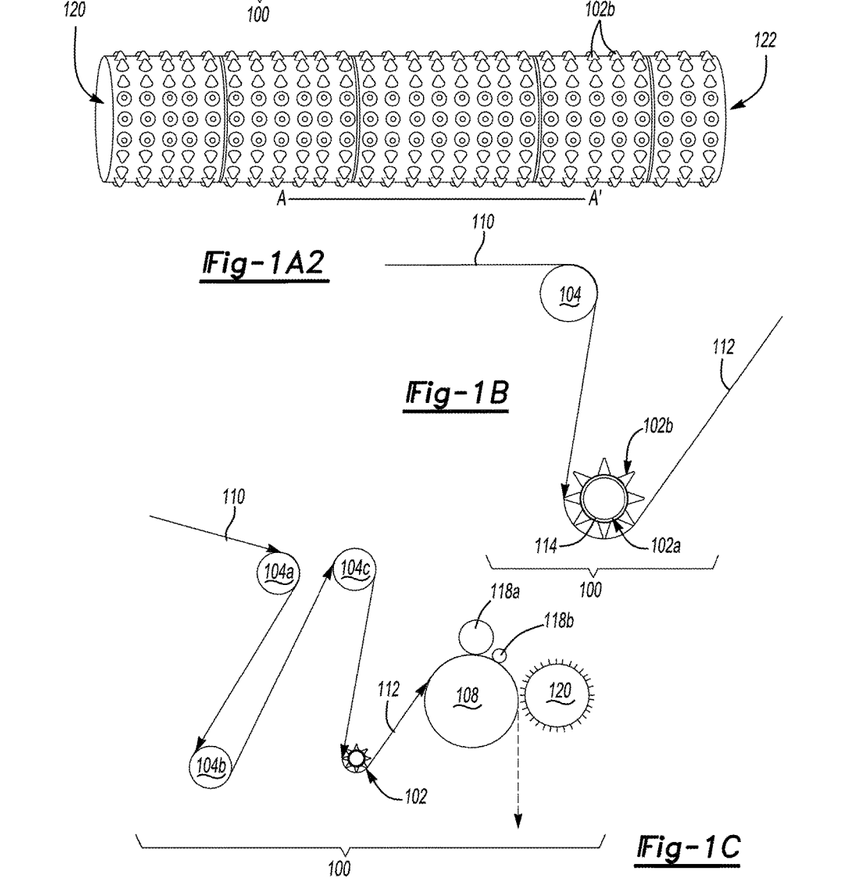

In one embodiment, and as depicted in FIG. 1A1 and FIG. 1A2, a fiber treatment system generally shown at 100 includes a rotatable nubbed roller 102 including an axis of rotation A-A' for loosening a fiber tow 110. The rotatable nubbed roller 102 includes a base 102a having a surface 114 and a number of spaced apart nubs 102b projecting from the surface 114. The spaced apart nubs 102b impart spaced apart openings 116 in the fiber tow 110 to form loosened fiber tow 112. In certain instances, and as depicted in FIG. 1A2, the surface 114 has a generally cylindrical shape, and the rotatable nubbed roller 102 has a pair of opposing ends 120, 122 with the surface extending there between.

In another embodiment, and as depicted in FIG. 1B, the fiber treatment system 100 may further include a spreader roller 104 for flattening the fiber tow 110 prior to being loosened via the rotatable nubbed roller 102. The spreader roller 104 may be presented with a smooth surface. Without wanting to be limited to any particular theory, it is believed that the flattening step at 104 helps increase the surface contact between the fiber tow 110 and the spaced apart nubs 102b of the rotatable nubbed roller 102. The increased surface contact, in turn, results in greater opening formation and better loosening of the fibers per unit weight of the fiber tow 110, and hence a population of more individualized fibers upon chopping.

Although one spreader roller 104 and one rotatable nubbed roller 102 are depicted in FIG. 1B, it is operable within the spirit of the present invention to employ two or more spreader rollers 104 in a serial relationship upstream of the nubbed roller 102, such as in a system illustrated in FIG. 1C, or to employ two or more rotatable nubbed rollers 102 downstream of the spreader roller 104. Alternatively, the spreader rollers 104 and the rotatable nubbed rollers 102 may mix and match in any suitable order as long as at least one spreader roller 104 is positioned upstream of at least one nubbed roller 102.

In yet another embodiment, and as depicted in FIG. 1C, three individual spreader rollers 104a, 104b, and 104c are positioned upstream of the rotatable nubbed roller 102. At least one of the spreader rollers 104a, 104b, and 104c are each optionally rotatable. In particular, spreader roller 104b is positioned below the spreader roller 104a to help effect a downward pulling and resultant flattening of the fiber tow. The spreader roller 104c is positioned above the spreader roller 104b to help effect an upward pulling and further flattening of the previously flattened fiber tow coming out of the spreader roller 104b. This non-limiting spacing arrangement of the spreader rollers 104a, 104b, 104c is believed to effectively assist with the fiber flattening and spreading as one or more of these spreader rollers may rotate about their respective shaft and do not necessarily provide much pulling on their own.

In yet another embodiment, the fiber treatment system 100 further includes a chopping station formed of a pulling roller 108, a pinching roller set 118a and 118b, and a chopper 120. In operation, the pulling roller 108 and the pinching roller set 118a and 118b together effect pulling of the loosened fiber tow 112 toward the chopper 120. The loosened fiber tow 112 is then chopped to certain predetermined length via chopper 120. In particular instances, and as depicted in FIG. 1C, cutting blades may be positioned on the outer surface of the chopper 120 and effect fiber cutting via contact with the outer surface of the pulling roller 108. However, any other suitable chopping stations may be used to effect the chopping of the 30 loosening fiber tow 112.

Figure 2A:
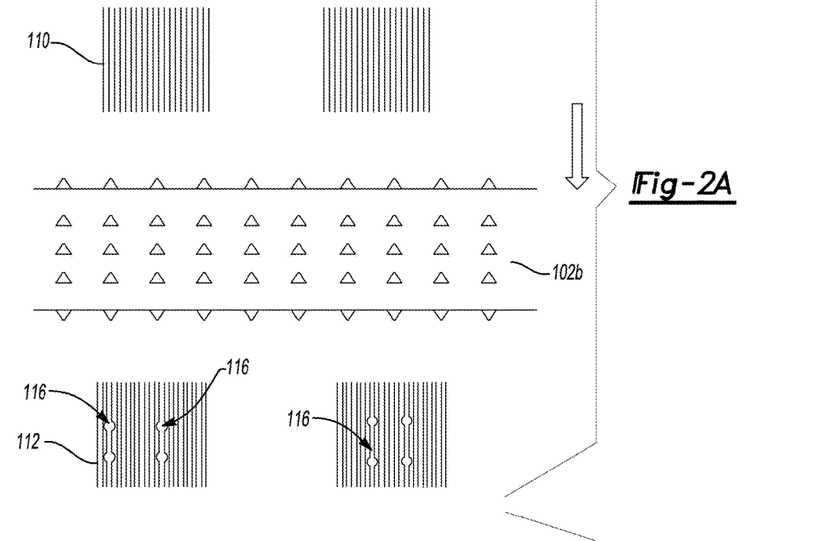
FIG. 2A depicts an expanded top view of a nubbed roller in a fiber treatment system according to yet another embodiment.

FIG. 2A depicts a non-limiting pattern of the spaced apart nubs 102b in an expanded top view, wherein the fiber tow 110 is shown being rolled toward the spaced apart nubs 102b in a rolling direction and being pressed against the spaced apart nubs 102b to form a loosened fiber tow 112 including corresponding spaced apart openings 116. At least a portion of the openings 116 are discrete relative to each other to effect loosening of the surrounding fiber filaments while still keeping the entire fiber tow 112 together as one not-yet-separated entity. The loosened, but still continuous, fiber tow 112 then gets pulled into the chopper and chopped. The chopping motion naturally breaks up the fiber tow 112 into smaller tow sized chopped fibers. One benefit of this arrangement is that the resultant loosened fiber tow 112 gets chopped immediately after loosening instead of being collected as individual smaller fiber tow spools as an extra processing step. Accordingly, the present invention provides a cost effective way of forming chopped fibers and fiber composites using the same.

The spaced apart nubs 102b may be formed integral of the base 102a, for instance, as a natural structure extension from the base 102a. In certain instances, the spaced apart nubs 102b and the base 102a may be formed from the same metallic and/or non-metallic material. Alternatively, the spaced apart nubs 102b may be detachable relative to the base 102a. In certain other instances, the spaced part portions 102b and the base 102a may be formed of different materials. In certain particular instances, the spaced apart nubs 102b may include a polymeric material such as thermoplastic polymer or thermoset polymer, including rubber. In certain other particular instances, the spaced apart nubs 102b together form a network of discrete piece of rubber material with protruding extensions. To further provide versatility and cost efficiency, the number of spaced apart nubs 102b may be presented in the form of a discrete piece readily attachable and detachable to any one of the existing spreader rollers 102a to perform opening and loosening of the fibers.

Figure 2B:
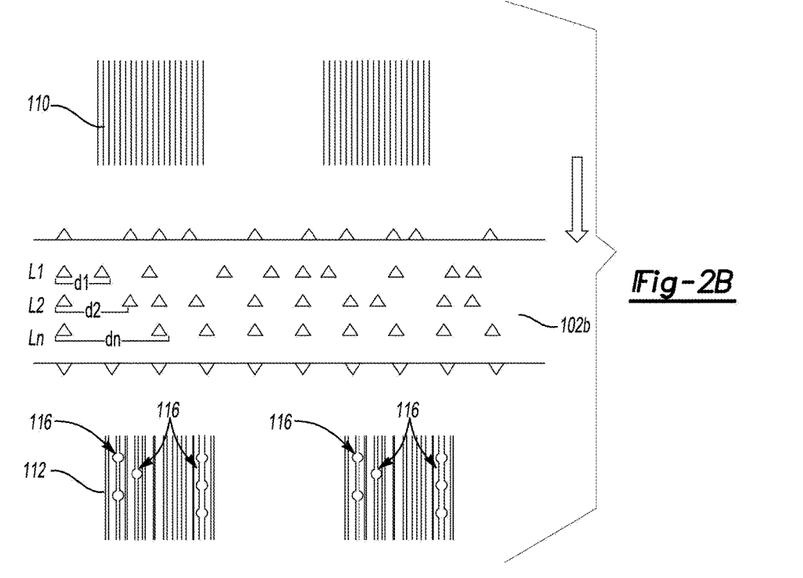
FIG. 2B depicts an expanded top view of a nubbed roller in a fiber treatment system according to yet another embodiment.

In certain instances, and as depicted in FIG. 2B, the spaced apart nubs generally shown at 102b may be nonuniformly aligned along a rolling direction with arrow shown. For instance, a space distance "d1" between two adjacent protrusions at line L1 is different from a space distance "d2" between two adjacent protrusions at line L2. Space distances "d1" and "d2" may each independently differ from a space distance "dn" between two adjacent protrusions at line Ln. In certain other instances, similar non-uniform arrangement can also be independently applied to the spaced apart nubs 102b along a direction different from the rolling direction, such as a direction traversal to the rolling direction.

Figure 3A:
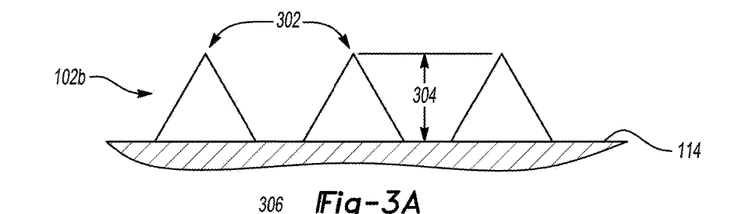
FIGS. 3A to 3D depict variable forms and arrangements of the spaced apart nubs according to yet another embodiment.
Figures 3B, 3C:
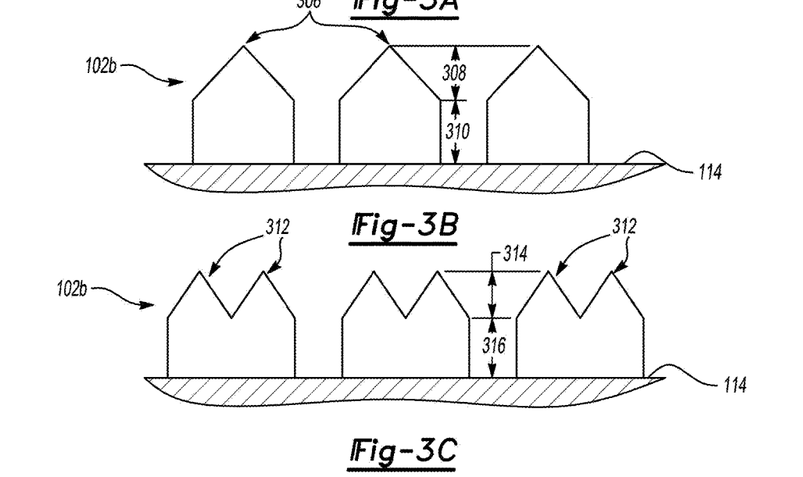
Figure 3D:
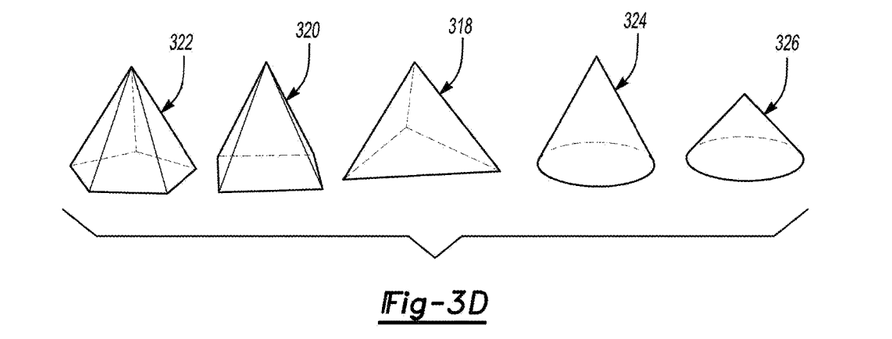

Moreover, and to introduce additional non-uniformity or randomness in the arrangement of the spaced apart nubs 102b, the nubs can be of different shapes, with non-limiting examples thereof including needles, triangles, or combinations thereof. For instance, and as depicted in FIG. 3A, the nubs 102b may have a cross-sectional shape of a triangle 304 with a point 302 for imparting openings in the fiber tows. As depicted in FIG. 3B, the nubs 102b may have a cross-sectional shape of a triangle 308 with a point 306 for imparting openings and a raised bottom 310. As depicted in FIG. 3C, the nubs 102b may have a cross sectional shape of two connected triangles 314 with points 312 for imparting openings and a raised bottom 316 for height adjustment. In these illustrated arrangements, the portions of the nubs 102b which have a cross-sectional shape of a triangle 304, 308, 314 may be in three-dimension of the form of a cone or a pyramid as illustrated in FIG. 3D. In certain instances, one or more of the edges 318, 320, 322, 324, 326 are not parallel to a plane in line with and/or defined by any one of the opposing ends 120, 122 of the rotatable nubbed roller 102. In certain other instances, the two or more points 312 per nub 102b are aligned in a direction not parallel to the rolling direction.

In certain instances, 90 percent of the chopped fiber produced from the loosened fiber tow 112 has an average tow width in the range of 4 to 10 millimeters. In certain other instances, 80 percent of the chopped fiber produced from the loosened fiber tow 112 has an average tow width in the range of 4 to 9 millimeters. In yet certain other instances, 70 percent of the chopped fiber produced from the loosened fiber tow 112 has an average tow width in the range of 4 to 8 millimeters. In yet certain other instances, 60 percent of the chopped fiber produced from the loosened fiber tow 112 has an average tow width in the range of 4 to 7 millimeters. In yet certain other instances, 40 percent of the chopped fiber produced from the loosened fiber tow 112 has an average tow width in the range of 4 to 6 millimeters. In yet certain other instances, 30 percent of the chopped fiber produced from the loosened fiber tow 112 has an average tow width in the range of 4 to 5 millimeters.

In yet certain other instances, 20 percent of the chopped fiber produced from the loosened fiber tow 112 has an average tow width in the range of 9 to 10 millimeters. In yet certain other instances, 30 percent of the chopped fiber produced from the loosened fiber tow 112 has an average tow width in the range of 8 to 10 millimeters. In yet certain other instances, 50 percent of the chopped fiber produced from the loosened fiber tow 112 has an average tow width in the range of 7 to 10 millimeters. In yet certain other instances, 60 percent of the chopped fiber produced from the loosened fiber tow 112 has an average tow width in the range of 6 to 10 millimeters. In yet certain other instances, 80 percent of the chopped fiber produced from the loosened fiber tow 112 has an average tow width in the range of 5 to 10 millimeters.

In certain instances, 90 percent of the chopped fiber produced from the loosened fiber tow 112 has an average tow weight of 15 to 65 milligrams per inch. In yet certain instances, 85 percent of the chopped fiber produced from the loosened fiber tow 112 has an average tow weight of 15 to 60 milligrams per inch. In certain instances, 80 percent of the chopped fiber produced from the loosened fiber tow 112 has an average tow weight of 15 to 55 milligrams per inch. In yet certain instances, 70 percent of the chopped fiber produced from the loosened fiber tow 112 has an average tow weight of 15 to 50 milligrams per inch. In yet certain instances, 55 percent of the chopped fiber produced from the loosened fiber tow 112 has an average tow weight of 15 to 45 milligrams per inch. In yet certain instances, 40 percent of the chopped fiber produced from the loosened fiber tow 112 has an average tow weight of 15 to 40 milligrams per inch. In yet certain instances, 35 percent of the chopped fiber produced from the loosened fiber tow 112 has an average tow weight of 15 to 35 milligrams per inch. In yet certain instances, 25 percent of the chopped fiber produced from the loosened fiber tow 112 has an average tow weight of 15 to 30 milligrams per inch. In yet certain instances, 20 percent of the chopped fiber produced from the loosened fiber tow 112 has an average tow weight of 15 to 25 milligrams per inch. In yet certain instances, 15 percent of the chopped fiber produced from the loosened fiber tow 112 has an average tow weight of 15 to 20 milligrams per inch.

In certain instances, 90 percent of the chopped fiber produced from the loosened fiber tow 112 has an average tow weight of 20 to 65 milligrams per inch. In certain other instances, 80 percent of the chopped fiber produced from the loosened fiber tow 112 has an average tow weight of 25 to 65 milligrams per inch. In yet certain other instances, 70 percent of the chopped fiber produced from the loosened fiber tow 112 has an average tow weight of 30 to 65 milligrams per inch. In yet certain other instances, 60 percent of the chopped fiber produced from the loosened fiber tow 112 has an average tow weight of 40 to 65 milligrams per inch. In yet certain other instances, 55 percent of the chopped fiber produced from the loosened fiber tow 112 has an average tow weight of 45 to 65 milligrams per inch. In yet certain other instances, 40 percent of the chopped fiber produced from the loosened fiber tow 112 has an average tow weight of 50 to 65 milligrams per inch. In yet certain other instances, 20 percent of the chopped fiber produced from the loosened fiber tow 112 has an average tow weight of 55 to 65 milligrams per inch. In yet certain other instances, 15 percent of the chopped fiber produced from the loosened fiber tow 112 has an average tow weight of 60 to 65 milligrams per inch.

Having generally described this invention, a further understanding can be obtained by reference to certain specific examples which are provided herein for purposes of illustration only and are not intended to be limiting unless otherwise specified.

EXAMPLE

Figure 4:
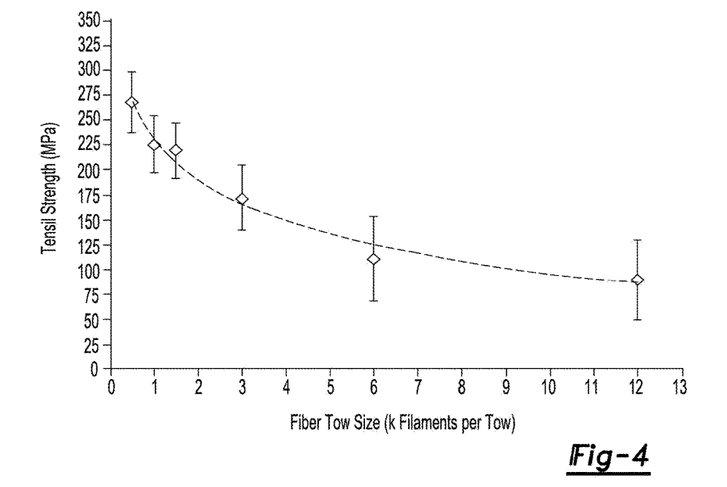
FIG. 4 depicts tensile strength values as a function of fiber tow sizes according to one example described herein.

FIG. 4 illustrates fiber composite tensile strength as a function of fiber tow size (number of fiber filaments in a fiber tow). As depicted in FIG. 4, the tensile strength of fiber composites increases from 85 MPa to 270 MPa as the fiber tow size decreases from 12 K to 0.5 K. An improvement in strength reinforcement may be attributed to better wet-out and dispersion of the smaller tow fibers in the resin matrix. This example demonstrates that fibers at certain tow size such as a tow size larger than 12K provides very little reinforcement in tensile strength of the resin composites.

Figure 5A:
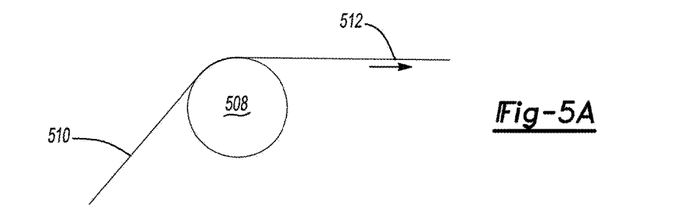
FIG. 5A depicts a fiber treatment system according to another example described herein.
Figure 5B:
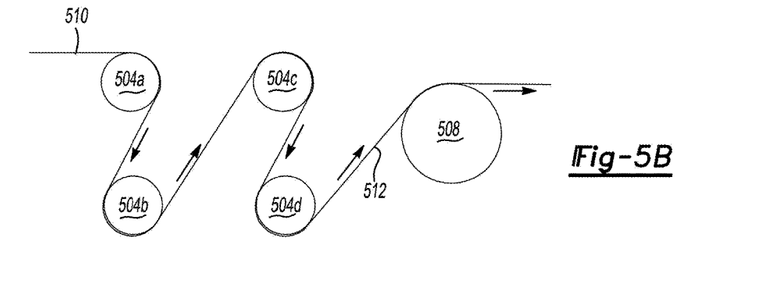
FIG. 5B depicts a fiber treatment system according to yet another example described herein.

FIGS. 5A and 5B depict two comparative fiber treatment systems. According to the system of FIG. 5A, a fiber tow 510 is pulled via a pulling roller 508 and is cut via a chopper (not shown) to form 1-inch chopped fibers. The system of FIG. 5A does not involve the use of any spreader roller such as the spreader roller 104 of FIG. 1B or any nubbed roller such as the nubbed roller 102 of FIG. 1A. The system of FIG. 5B includes four smooth spreader rollers 504a, 504b, 504c, 504d placed upstream of a pulling roller 508. The spreader rollers 504a, 504b, 504c, 504d are to flatten a fiber tow 510, making it thinner and more flattened to become a treated fiber tow 510 that may be chopped via a downstream chopper (not shown). The system of FIG. 5B does not involve the use of any nubbed rollers such as the nubbed roller 102 in FIG. 1A. The fibers used for this comparative example are Panex 35 by Zoltek with a 50K original tow size. The 1-inch chopped fibers may be combined with resin paste to form composite products. It is preferable that the resin system couples well with the chopped fibers in order to achieve adequate fiber reinforcement for the desired properties.

Figure 6A:
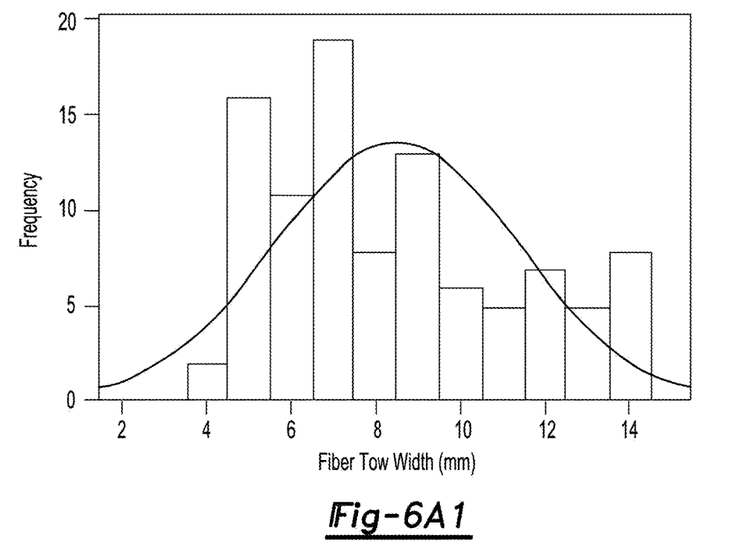
Figure 6A:
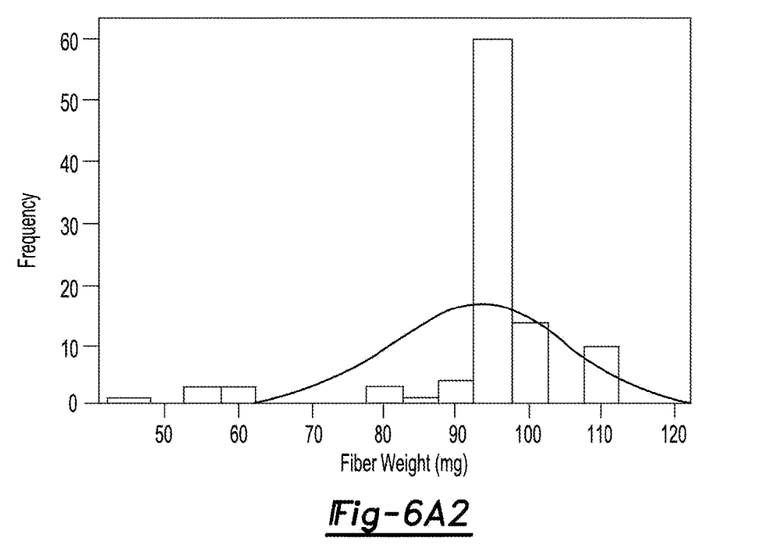
Figure 6B:
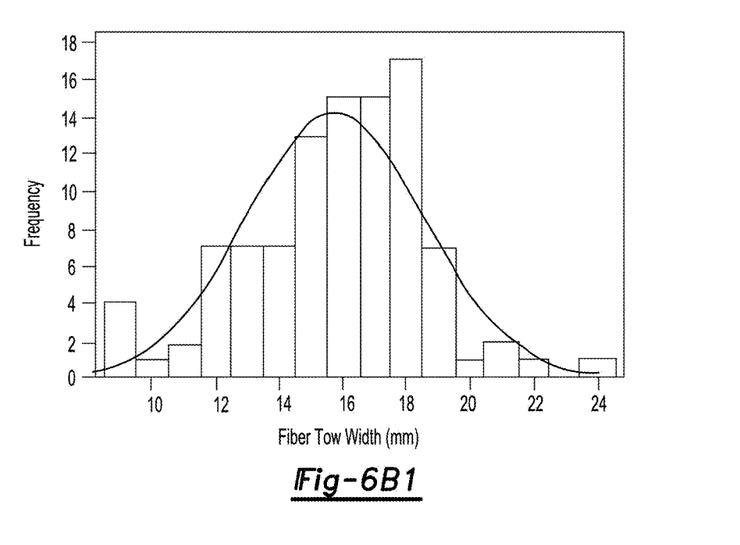
Figure 6B:
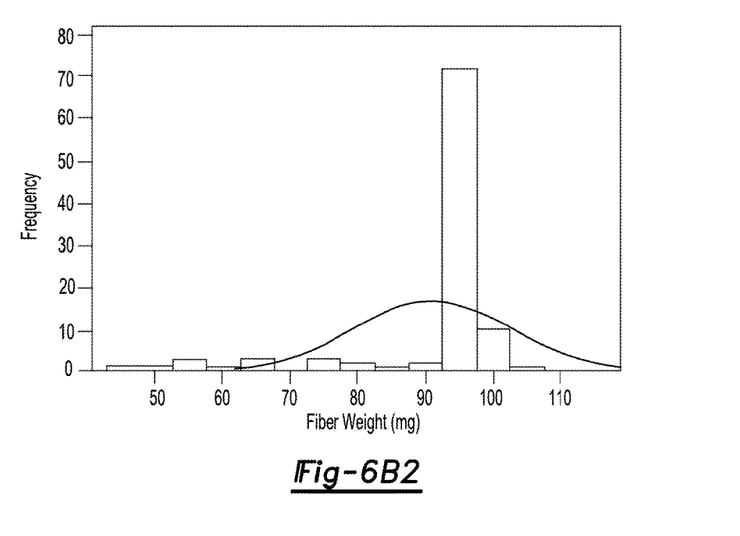

Corresponding data is recorded in FIGS. 6A1 and 6A2 and 6B1 and 6B2. FIGS. 6A1 and 6A2 show, respectively, the distributions of width and weight of the 1-inch chopped fiber tow prepared by the system of FIG. 5A. FIGS. 6B1 and 6B2 show, respectively, distributions of width and weight of 1-inch chopped fiber tow prepared by the system of FIG. 5B. The results indicate that the rollers have flattened and spread the 50K fiber tows from the original mean width of 8.5 millimeters (mm) to the mean width of 15.8 mm. The roller processed fiber tows, however, remain intact with no apparent breaking-up in tow size. This is evidenced by the almost identical mean weight of approximately 92 milligrams (mg) and very similar weight distribution of the 1-inch chopped fibers with and without the roller processing. The 92 mg fiber weight corresponds to the total weight of 50,000 one inch fiber filaments in the Panex 35 carbon fiber tows.

In comparison to the system of FIG. 5A or the system of FIG. 5B, a fiber treatment system is prepared pursuant to and as a non-limiting example of FIG. 1C. In this example, to one of the spreader rollers is attached or covered with a nubbed rubber sheet that has protruding bumps mechanically penetrating and opening up the fiber tow to form loosened or opened fiber tow. The round nubs on the rubber sheet are approximately 3 mm in diameter and 2 mm high, arranged approximately 8 mm apart in both x- and y-directions. After being chopped subsequently at a chopper, resultant distributions of width and weight of the 1-inch chopped fiber tow are depicted in FIGS. 7A and 7B.

Figure 7A:
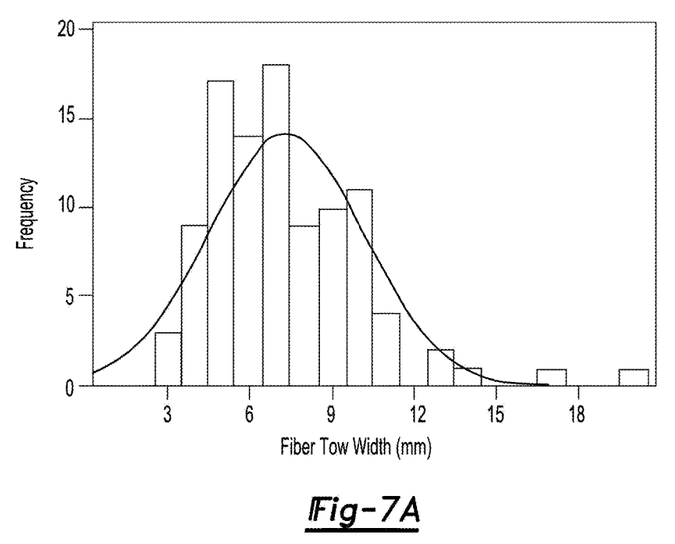
FIGS. 7A and 7B depict various analysis values according to yet another example described herein.
Figure 7B:
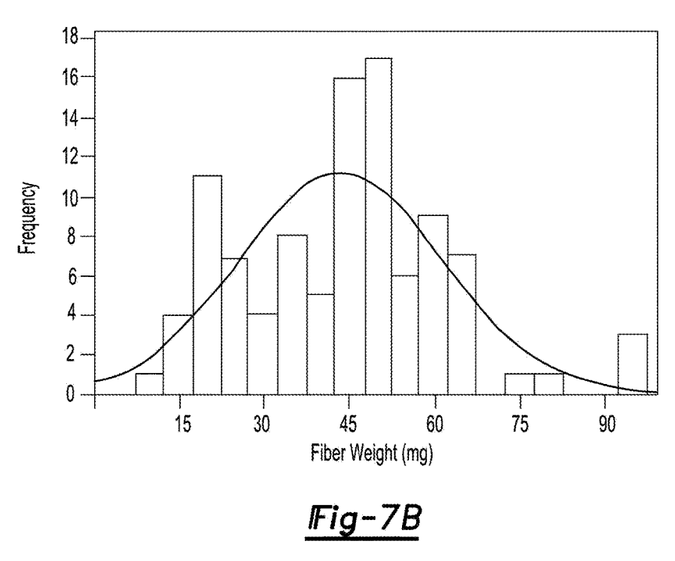
Figure 8A:
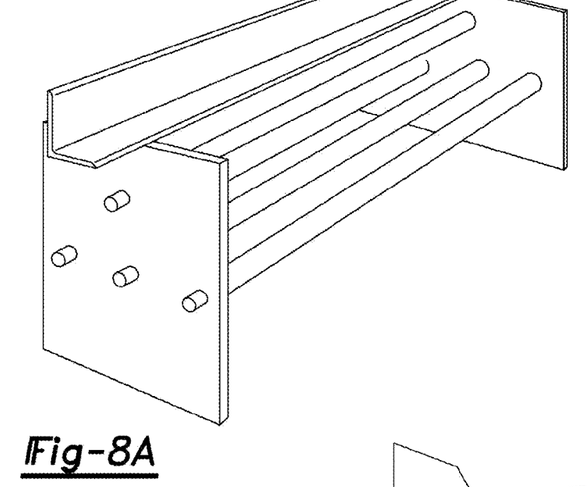
FIGS. 8A and 8B depict non-limiting examples of the fiber treatment system according to yet another embodiment.
Figure 8B:
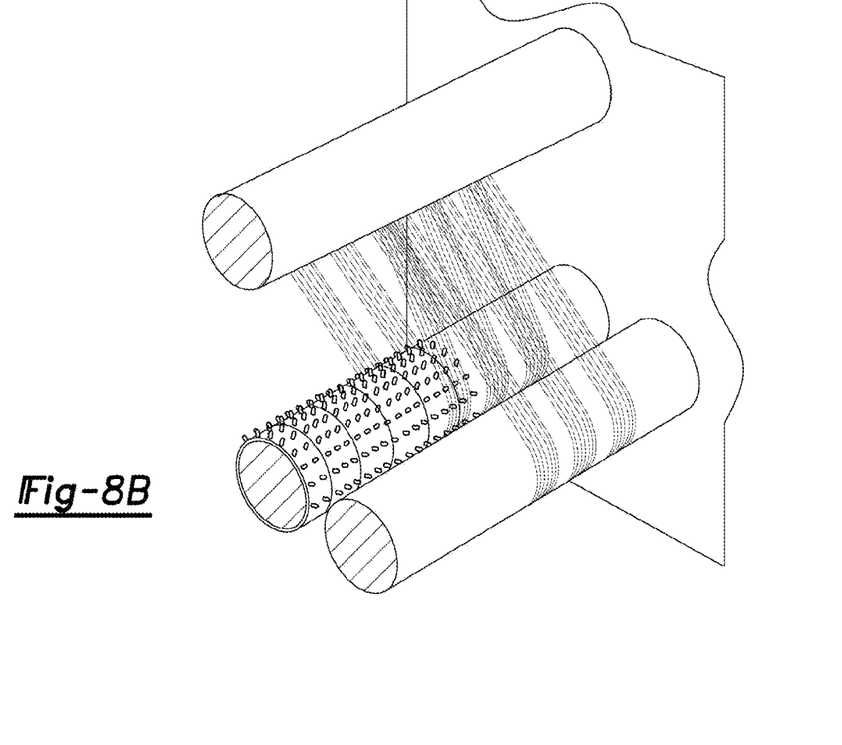

As depicted in FIG. 7A and 7B, the data indicate that the mean width of the chopped fibers is 7.3 mm, as compared to 8.5 mm for fibers processed with the system of FIG. 5A and 15.8 mm for those processed with the system of FIG. 5B. The mean fiber weight of the 1-inch chopped fiber tow is 43.7 mg as compared to the original 92 mg in relation to FIGS. 5A and 5B. The weight change indicates that the system of FIG. 1C, when coupled with a downstream chopper, has effectively caused tow reduction in the loosened, chopped fiber tow, say from the original 50K to two approximately 25K tow bundles. In certain instances, non-limiting examples of the fiber treatment system according to yet another embodiment are depicted in FIGS. 8A and 8B.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of treating fiber tow, comprising:
applying a nubbed roller to a first fiber tow having a first fiber tow size to produce a number of openings in the first fiber tow; and
via a pulling roller, immediately transferring the first fiber tow with the number of openings from the nubbed roller to a chopping station that includes the pulling roller and a chopper, wherein the chopper cooperates with the pulling roller to chop the first fiber tow, and wherein the step of transferring occurs after the step of applying without an intermediate step of processing therebetween; and
via the pulling roller and the chopper, chopping the first fiber tow with the number of openings to produce a second fiber tow having a second fiber tow size less than the first fiber tow size.

2. The method of claim 1, wherein the nubbed roller includes a plurality of projections that are non-uniformly spaced along the nubbed roller such that the chopping step produces a plurality of fiber tow segments having non-uniform widths.

3. The method of claim 1, further comprising flattening the first fiber tow prior to the applying step.

4. The method of claim 3, wherein the flattening step includes utilizing at least two flattening rollers located at different elevations.

5. The method of claim 1, wherein the chopping step occurs after the applying step without an intermediate step of collecting a spool of the fiber tow therebetween.

* * * * *